UNITED STATES PATENT OFFICE.

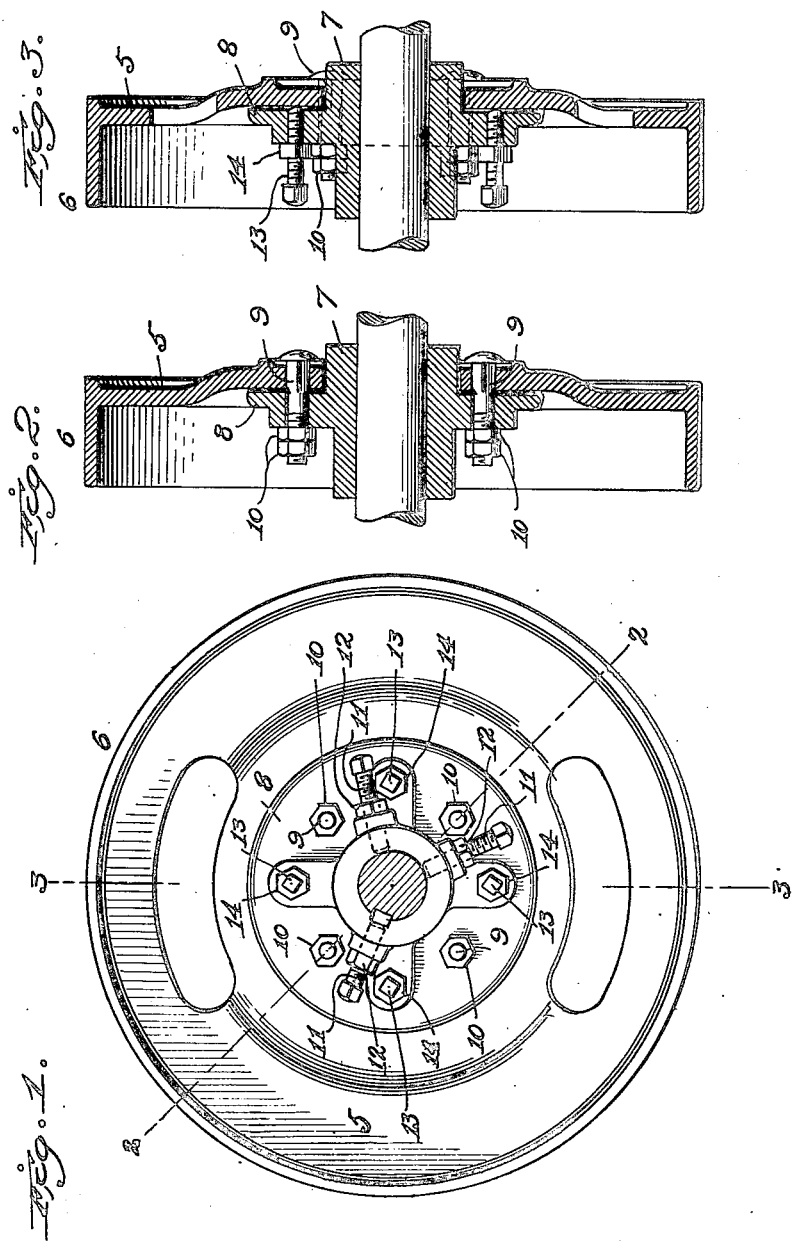

HENRY W. MORGAN AND EDWARD P. HOLDER, OF GREENVILLE, SOUTH CAROLINA.

TIGHT BAND PULLEY.

1,421,708.  Specification of Letters Patent.  Patented July 4, 1922.

Application filed August 22, 1921. Serial No. 494,376.

*To all whom it may concern:*

Be it known that we, HENRY W. MORGAN and EDWARD P. HOLDER, citizens of the United States of America, and residents, respectively, of Greenville, county of Greenville, and State of South Carolina, have invented certain new and useful Improvements in Tight Band Pulleys, of which the following is a full and clear specification.

The object of this invention is to provide a hub for a tight band pulley to ensure the hub being not only rigidly attached to the body of the pulley but also to permit the pulley body to be set true on the shaft, as more fully hereinafter set forth.

In the drawing—

Fig. 1 is a side elevation;

Figs. 2 and 3 are sectional views respectively on the lines 2—2 and 3—3 of Fig. 1.

Referring to the drawing by reference-characters, 5 designates the usual web-like body of the pulley provided with a pulley-receiving periphery 6 at its outer edge and with a central hole. The hub consists of a cylindrical part 7 and an annular flange 8 integrally formed thereon midway the ends of the cylindrical part 7. One end of the hub-part 7 is adapted to fit and extend through a hole in the center of the pulley body 5, and the adjacent face of the flange 8 is adapted to bear against the adjacent face of the pulley body 5. The parts are clamped in this relation by means of a series of bolts 9 extending through the web 5 and the flange 8 and provided on their projecting ends with nuts 10. The head-ends of the nuts 9 are squared to fit in square holes in the web 5. The hub proper 7 is provided with a series of radial bolts 11 tapped through the hub and adapted to serve as set-screws for fastening the hub to the shaft, suitable lock-nuts 12 being employed.

An additional series of four set-screws 13 is employed, these being parallel with the bolts 9 and the shaft and being tapped through the flange 8 equal distances apart, lock-nuts 14 being employed for these set-screws. Each set-screw bears against the adjacent face of the pulley-web 5. It will be observed that a pulley thus constructed may be attached to a shaft at any point along the length thereof without the employment of a feather or key. A special feature of advantage is that the series of set-screws 13 permit the pulley to be trued on the shaft to ensure the belt-receiving surface of the rim 6 being in exact alinement with the axis of the shaft. While our pulley may be used in any machine, we have especially designed it for use as a drive-pulley for the Draper loom. In this type of loom, it is customary to locate the drive-pulley adjacent a large gear-wheel on one side and a loose pulley on the other side, the loose pulley being at the open side of the tight pulley. When thus used, the loose pulley serves as a cover for the open side of the tight pulley and in that manner practically houses all the bolts and nuts. With our construction, we can readily repair a broken Draper loom pulley by simply sawing out the hub thereof and substituting our separate hub. The ordinary Draper pulley lends itself nicely to this plan of saving the pulley, since the sawing out of the original hub provides the necessary hole for the insertion of the hub 7 of our pulley, it being simply necessary to drill the holes in the webs for bolts 9. This is a very important use of our invention, since it is very common for this Draper-loom type of pulley to break at the hubs because of the extreme jar and strains that occur every time the belt is shifted from the loose pulley to the tight pulley.

The nature and scope of the invention having been thus indicated and its preferred embodiment having been specifically described, what is claimed as new is:

In combination, a pulley body having a central hole and a series of bolt-holes around the same, a pulley-hub extending through said hole and provided with a radial flange overlapping the pulley body and provided with bolt-holes coinciding with the bolt-holes in the pulley body, clamp-bolts extending through said coinciding holes, and a plurality of set-screws tapped through said flange and bearing upon the adjacent face of the pulley body, for the purpose set forth.

In testimony whereof we hereunto affix our signatures this 19th day of August, 1921.

HENRY W. MORGAN.
EDWARD P. HOLDER.

Witnesses:
G. G. POWERS,
W. B. RAMSEY.